(12) United States Patent
Johnston et al.

(10) Patent No.: US 11,625,152 B1
(45) Date of Patent: Apr. 11, 2023

(54) AUTOMATED WORKFLOW SELECTION FOR AGENT WITHIN AN ELECTRONIC CONVERSATION SYSTEM

(71) Applicant: Interactions LLC, Franklin, MA (US)

(72) Inventors: Michael Johnston, New York, NY (US); Seyed Eman Mahmoodi, Staten Island, NY (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 17/514,958

(22) Filed: Oct. 29, 2021

(51) Int. Cl.
| | | |
|---|---|---|
| *G06F 3/0482* | (2013.01) | |
| *G06F 40/20* | (2020.01) | |
| *G06N 20/00* | (2019.01) | |
| *G06Q 10/1093* | (2023.01) | |
| *G06F 16/31* | (2019.01) | |
| *G10L 15/18* | (2013.01) | |
| *G10L 15/22* | (2006.01) | |
| *G10L 15/30* | (2013.01) | |

(52) U.S. Cl.
CPC .......... *G06F 3/0482* (2013.01); *G06F 16/328* (2019.01); *G06F 40/20* (2020.01); *G06N 20/00* (2019.01); *G06Q 10/1097* (2013.01); *G10L 15/1815* (2013.01); *G10L 15/22* (2013.01); *G10L 15/30* (2013.01)

(58) Field of Classification Search
CPC ...... G06F 3/0482; G06F 16/328; G06F 40/20; G06N 20/00; G06Q 10/1097; G10L 15/1815; G10L 15/22; G10L 15/30
See application file for complete search history.

(56) References Cited

U.S. PATENT DOCUMENTS

2010/0274618 A1* 10/2010 Byrd ...................... G06Q 10/10
704/275
2019/0043483 A1* 2/2019 Chakraborty ........ G06N 3/0454

* cited by examiner

*Primary Examiner* — Pei Yong Weng
(74) *Attorney, Agent, or Firm* — Fenwick & West LLP

(57) ABSTRACT

Within an environment in which users converse at least partly with human agents to accomplish a desired task, a server assists the agents by identifying workflows that are most applicable to the current conversation. Workflow selection functionality identifies one or more candidate workflows based on techniques such as user intent inference, conversation state tracking, or search, according to various embodiments. The identified candidate workflows are either automatically selected on behalf of the agent, or are presented to the agent for manual selection.

20 Claims, 5 Drawing Sheets

Dialog action prediction where it is offered to the agent to switch workflow from reservation to payment and first billing task is to enter credit card information

AUTOMATED WORKFLOW SELECTION FOR AGENT WITHIN AN ELECTRONIC CONVERSATION SYSTEM

FIELD OF ART

The disclosure generally relates to natural language processing (NLP), and more particularly, to automatic selection of workflows for use by an agent assisting a user in an electronic conversation system.

BACKGROUND

Many organizations allow customers or other users to have an interactive conversation with their systems for purposes such as obtaining customer assistance. Such organizations may employ automated conversations using artificial intelligence (AI), but may also employ human agents to conduct at least part of the conversations. Contemporary agent software used by customer service agents assisting customers or other users generally supports numerous different workflows and their associated forms, process widgets, and tools that agents need to use in order to perform their work (e.g., obtaining the necessary information to carry out a task for the user, such as booking a hotel room). In some cases, the number of workflows is so large (e.g., hundreds or thousands or more) that search tools must be developed to assist agents in finding the appropriate forms/widgets/tools for fulfilling a particular user request.

The large number of workflows, forms, process widgets, and tools that agents need to access can result both in a steep learning curve for agents taking on new tasks, and in request latency due to the time required for an agent to find the appropriate workflow, which leads to a poor experience for the end customer.

SUMMARY

The embodiments disclosed herein address the problems posed by large numbers of possible workflows by integrating into the agent software an AI system that monitors the conversation between the agent and the user in real time, identifies associations between what the agent and customer are saying and the available workflows, and automatically recommends suitable candidate workflows (including associated forms and widgets) to the agent so that the agent can more easily and rapidly select among and use them.

In some embodiments this is performed in a semi-automatic fashion, where the system incrementally populates a dynamic list of suggested workflows for the agent to select among, and/or will suggest that the agent use a particular workflow. In other embodiments, when sufficiently confident, the system will automatically select and enable a workflow, without requiring the human agent to make a manual selection among candidates.

As one example, for a power company virtual assistant, when the customer says "I'd like to move my service to a new address" (as in FIG. 1), the system detects the intent of the user and surfaces to the agent a widget for transferring service from one location to another, which the agent can then use to implement the requested change of service. As another example, in a hotel reservation task, when the customer says "I would like to make a new booking," the system determines the user intent to reserve a hotel room and surfaces a reservation form that the agent can use to collect the user's reservation information. Later in the dialog, when the agent says "how would you like to pay," the system surfaces a payment widget with fields for collecting credit card numbers, CVV number, expiration date, and so on.

In some embodiments, the agent's use of (or rejection of) a workflow surfaced by the system is tracked and used to inform decisions on future selection and presentation of workflows, such as by training a workflow selection model. Moreover, by prediction of the next task in the system, the system can autonomously alert the agent (or agents) that at a specific part of conversation there is a need to switch from the current workflow to a workflow for the predicted next task.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The goal of the techniques described herein is to simplify the work of a customer service agent or other individuals engaged in assisting a user of a system, such as a customer. In addition to customer service scenarios, the two individuals could be, for example, a doctor (agent) and a patient (user), or a student (user) and a teacher (agent).

We first describe the functional user experience enabled by the system. The agent or other individual (e.g. doctor, teacher), in addition to participating in a conversation (which may be carried out using different media, such as by telephone call, audio chat, text chat or any combination thereof), also has a graphical user interface (GUI) available to her. (The software providing the GUI and related functionality is referred to herein as the "agent desktop" or "agent desktop software.") In the case of an audio conversation, in some embodiments the GUI presents an incremental transcription of the conversation, as illustrated in the transcript area 110 of FIG. 1, in which the utterances of the two speakers in the conversation are visually broken out so that the conversation appears as a chat. Another portion of the user interface contains a workflow view 120. As the conversation unfolds, the system applies a prediction algorithm to the conversation (e.g., to its textual transcription) in order to determine likely workflows that may be applicable to the current point in the conversation, and displays visual indications of these "candidate" workflows within a workflow selection area 130 (e.g., in the example of FIG. 1, the "Move Service", "New Service", "Cancel Service", and "Make Payment . . . " workflows). In some embodiments these workflows are automatically surfaced without any confirmation from the user. In some embodiments, the system surfaces a visual element or hint in the GUI, which the agent can select in order to choose the relevant workflow. In yet other embodiments (such as that illustrated in area 130 of FIG. 1), the system presents a list of multiple relevant workflows and the agent or individual selects among them by clicking, dragging, or other graphical user interface actions. These different techniques may also be combined. For instance, in the example of FIG. 1, the "move service" workflow has been automatically selected based on the system's analysis of the customer user's utterance, "I'd like to move my service to a new address," although the agent is also free to select another one of the workflows instead of this default selection.

Figure 1:
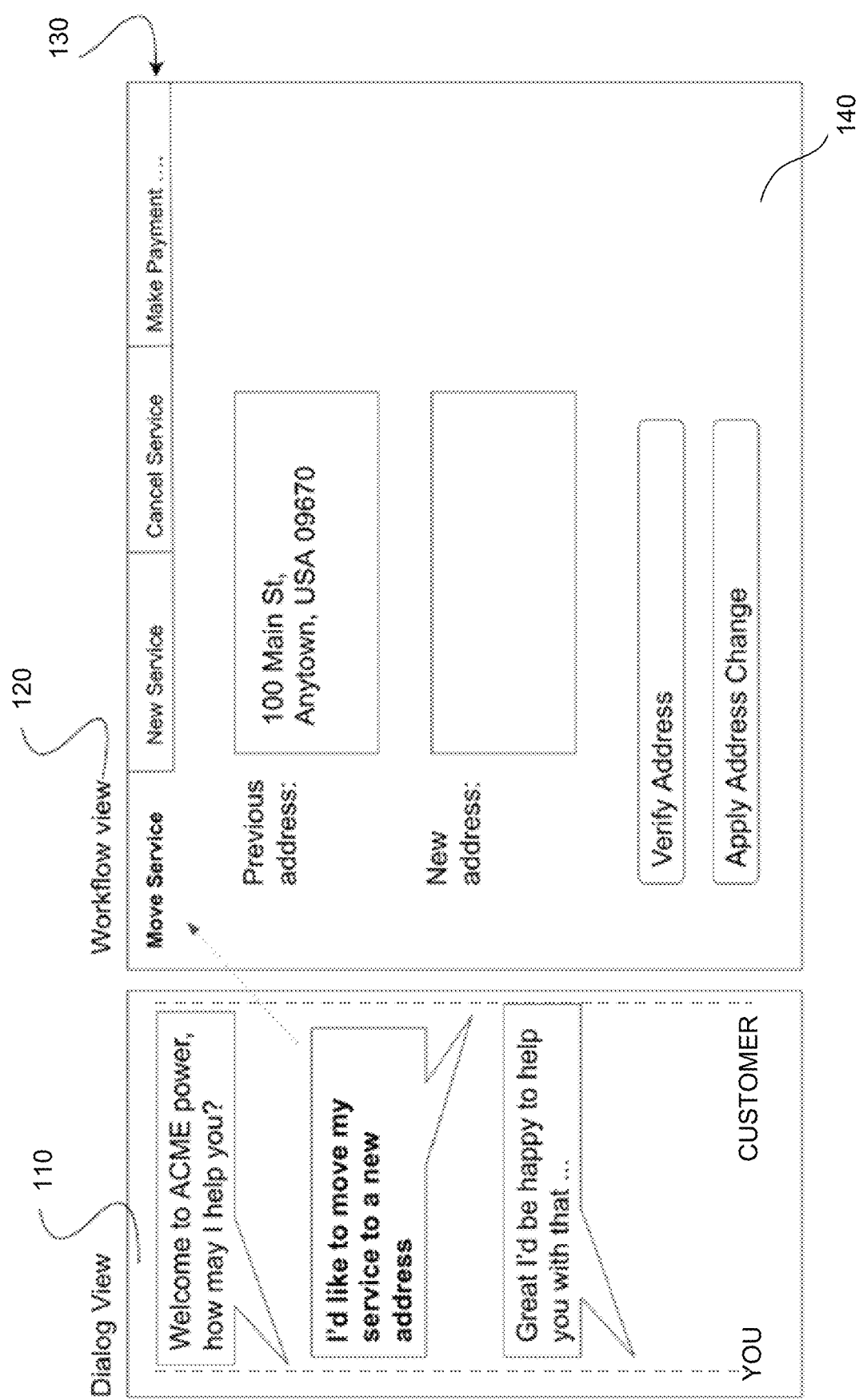
FIG. 1 illustrates a user interface within agent desktop software for selecting and using workflows, according to some embodiments.
Figure 2:
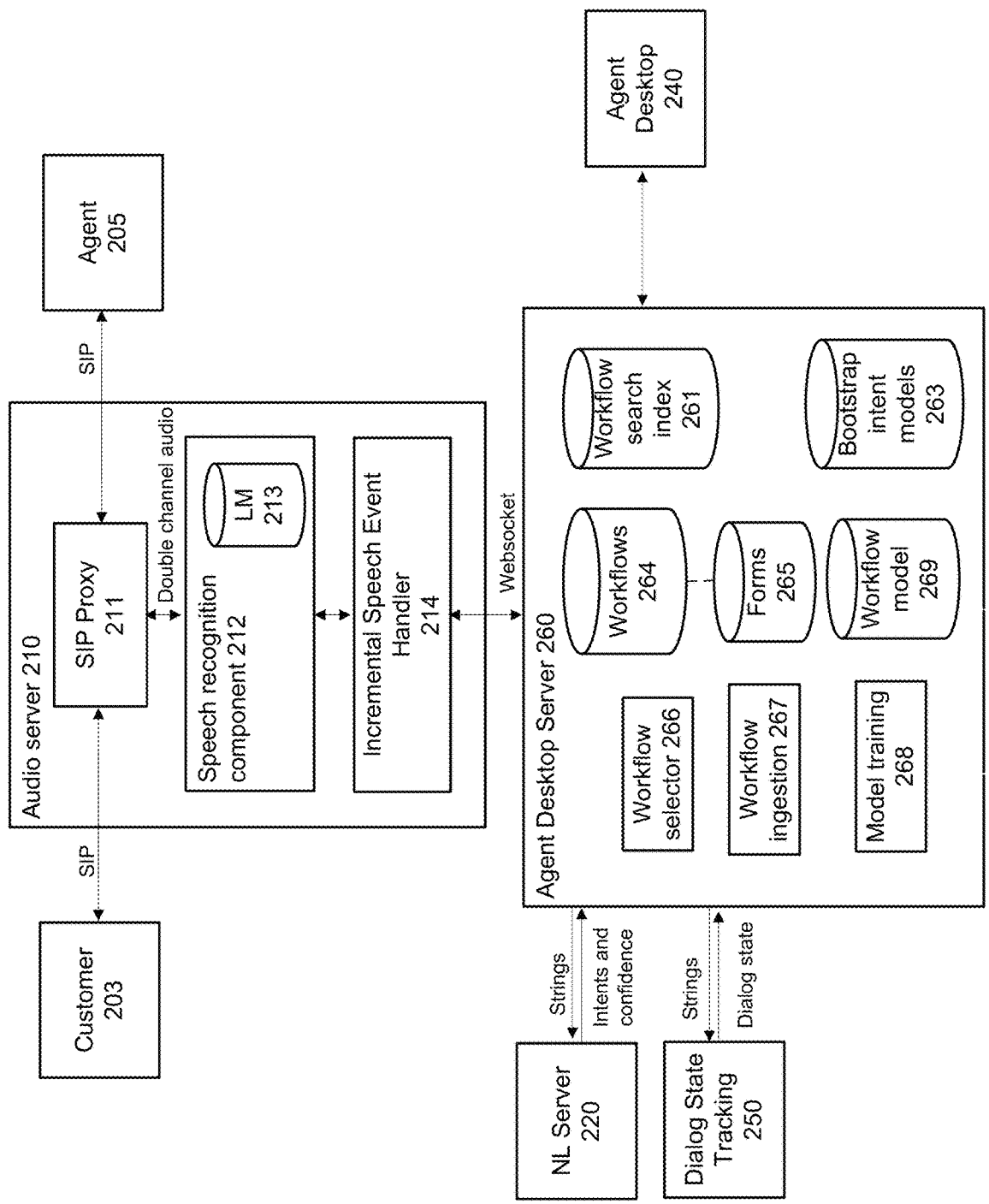
FIG. 2 illustrates a computing environment in which a system user converses with a human agent via voice while a server aids the agent in selecting a conversation-appropriate workflow, according to one embodiment.

FIG. 2 illustrates the various components that work in concert to enable the functional experience described above, for embodiments in which the conversation is carried out by voice. The customer 203 and an agent 205 are in a spoken conversation which comes into an audio server 210, which in some embodiments uses a SIP Proxy 211 for Session Initiation Protocol (SIP) or an alternative telephony or audio protocol for transmission of speech. In the audio server 210 a speech recognition component 212 applies to both channels of audio (i.e., that of the customer and that of the agent) and generates transcription of the incoming signals into words. A speech recognition language model 213 is used to inform the process of speech recognition. The speech recognition component 212 passes events to an incremental speech event handler 214, which continuously passes those events on to an agent desktop server 260. The function of the agent desktop server 260 is to serve up and support the agent desktop 240, the agent software described above and in FIG. 1.

In some embodiments, as each "turn" from the customer (i.e., a discrete utterance serving as the customer's contribution to the conversation before the receipt of the agent's next utterance) is received, the results of speech recognition (or text from chat) are passed to a natural language (NL) server 220, which performs natural language processing to determine the meanings of the recognized speech (e.g., the intents of the users). Since these meanings can be determined by the NL server 220 at each turn, the meanings may likewise potentially be used at each turn to determine one or more new candidate workflows.

Figure 3:
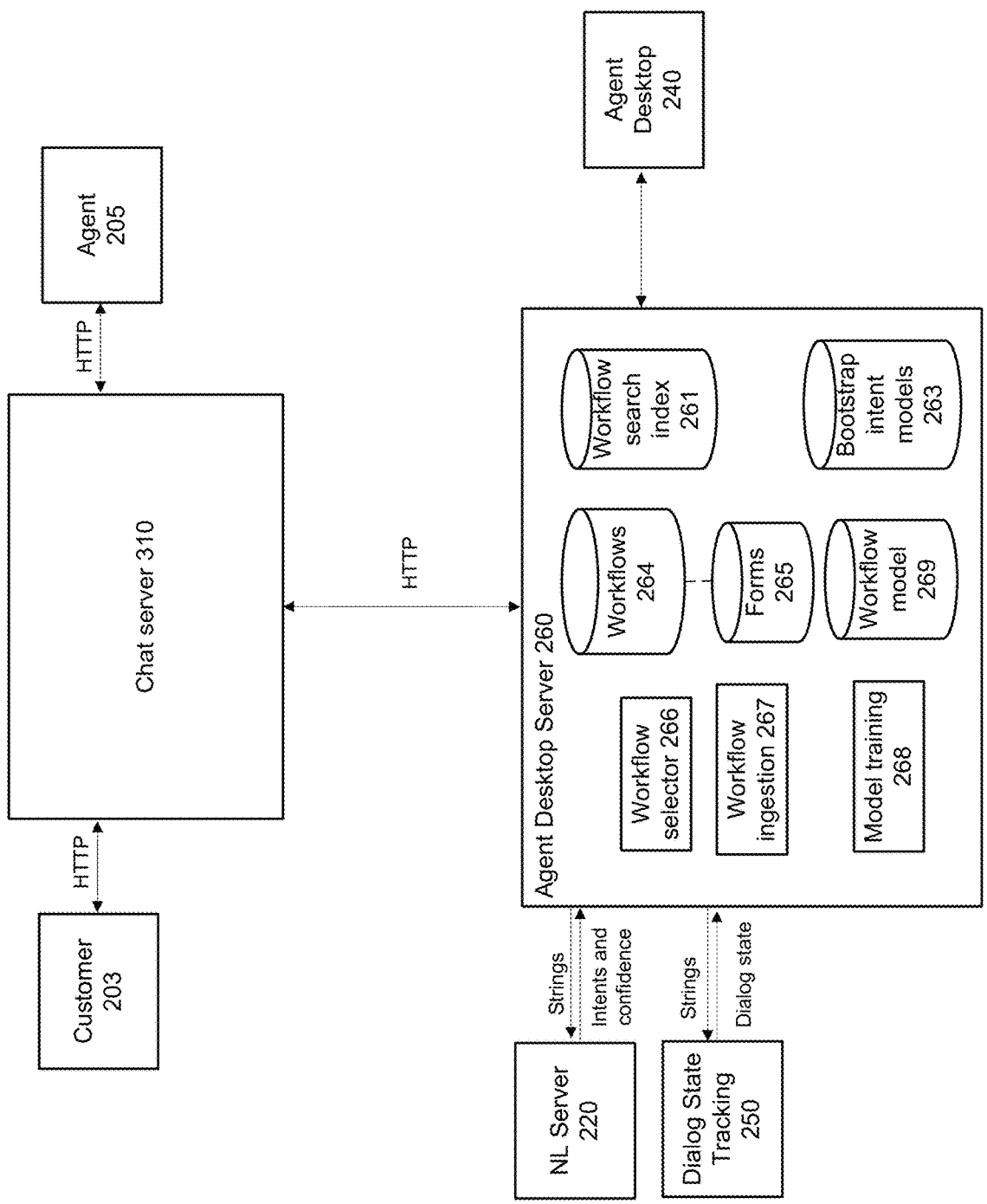
FIG. 3 illustrates a computing environment in which a system user converses with a human agent via text while a server aids the agent in selecting a conversation-appropriate workflow, according to one embodiment.

In addition to or as an alternative to processing speech, in the embodiment illustrated in FIG. 3, the system processes conversations in textual form, such as those in Short Message Service (SMS), web chat, or social channels. In those cases there is no speech recognition, and the customer and agent text inputs are fed directly to the agent desktop server 260 of the chat server 310 and used as inputs to the NL server 220. In these embodiments, chat windows or clients of the customer 203 and agent 205 may be connected to the chat server over HTTP, or websockets of other protocols, and the chat server 310 transmits incoming messages from customer and agent to the agent desktop server 260 over HTTP, websockets or some other appropriate protocol.

The agent desktop server 260 includes and/or uses a number of components that allow it to select and/or suggest workflows for a given user-agent conversation. For example, the agent desktop server 260 uses a natural language (NL) server 220 to analyze and interpret the conversation. The NL server 220 takes strings of text (representing the text of the conversation) as input and outputs semantic information about the conversation, such as intents and corresponding confidence values (e.g., a score indicating 61% confidence that the text of the conversation corresponds to an intent to move the user's service address).

In some embodiments, the agent desktop server 260 uses a dialog state tracking module 250, which tracks a state of the conversation and accepts conversational input (e.g., strings of text produced by the speech recognition components 212 and uses it to adjust the current state. For example, the dialog state tracking module 250 might indicate that the current state of a new conversation is "Initial", and given the string "I'd like to move my service to a new address" (or the intent "move service"), the dialog state tracking module might change its tracked state from "Initial" to "Moving service."

The agent desktop server 260 includes a workflows repository 264 that describes the set of all workflows supported by the system. In some embodiments, each workflow has an associated name (e.g., "Move Service") and task (moving the user's phone service to a new address), and an associated set of forms 265. The forms 265 are user interfaces usable within the agent desktop 240 to further the workflow task, and include a set of user interface elements for obtaining any data items specified by the workflow. For instance, in the example of FIG. 1, the form 140 associated with the "Move Service" workflow has user interface elements including text areas for the previous and new addresses, a button causing address verification, and a button causing the address change from the previous to the new address to be applied to the customer's account. A workflow may additionally have other associated data, such as an intent (e.g., an intent to move the service address) that triggers the use of the workflow, and/or the names of the user interface elements in the GUI (e.g., "original address" and "new address"). A workflow may also have associated documentation used by agents to for learning to use the workflow, such as textual instructions about the purpose of the workflow, the meaning of the various user interface elements, the types of values that should be entered into those elements, suggested statements to give to the user, and the like.

In some embodiments, the agent desktop server 260 includes a workflow search index 261 that facilitates searching the workflow repository 264 for workflows matching given criteria. In this approach, any text associated with a workflow in the repository of workflows 264—such as metadata about the workflow, documentation for the workflow, or labels for fields in forms 265 that are used in the workflow—is used to establish a "document" of text for each workflow.

In some embodiments the agent desktop server 260 has bootstrap intent models 263 that are provided to the NL server 220 in order to assign intent labels to user utterances. These bootstrap intent models 263 may be based initially on the descriptions of workflows 264 and be augmented by a system designer or analyst with additional phrases or examples associated with each intent. For example, for the 'Move Service' intent, the examples for training the bootstrap model might include "I would like to move my service", "I just moved", "I need to change my service to a new address", "How do I get service at my new address?" and so on.

The agent desktop server 260 includes a workflow selector module 266 that identifies one or more workflows from the workflows repository 264 that are likely appropriate for fulfilling a current conversation task of the customer 203, given the conversation between the customer 203 and the system/agent 205 thus far. In some embodiments, the NL server 220 applies an intent classifier to utterances from the customer 203. In these embodiments, if the NL server 220 returns an intent with a sufficiently high confidence (i.e., of at least some given threshold), and there is a workflow in the workflow repository 264 that has that intent associated with it, then the workflow selector module 266 makes that workflow available to the agent desktop 240. As described above, in some embodiments the main workflow changes automatically, while in others the availability of the workflow appears as a visual indication that the agent may select, such as the service names in area 130 of FIG. 1. In some embodiments the workflow selector module 266 server will return a number of different workflows that match the customer's input, and each of these candidate workflows is assigned a score that can be used to rank the workflows relative to each other.

In other embodiments, in addition to (or instead of) the application of an intent classifier, at each dialog turn identified by the dialog state tracking module 250, the workflow selector module 266 uses the conversation input to update a probability distribution over the available workflows, which is maintained by the dialog state tracking module. Thus, in these documents, the workflow selector module 266 uses not only the latest utterances within the conversation to identify which workflows are most applicable, but also uses conversation state information determined in prior conversation turns, such as an identifier of the present state, and/or the state-based probability distribution of expected next workflows. In some embodiments the input to the dialog state tracking module 250 is in the form of intents and entities identified by the NL server 220. In other embodiments the dialog state tracking component 250 operates directly on words. In case of embodiments of dialog state tracking which operate on intents and entities, the intents and entities are created by models in the NL server 220. For example, entities result from tagging e.g. dates in text "I need to move on <date>December 10</date>". Intent classifiers (from NL server 220) are also modeled based on the corpus of large data related to labeled documents (sentences). For example, reserve(room) for "I want to _RESERVE from _CKIN_DATE to _CKOUT_DATE or _CHANGE_RESERVATION", or change(reservation) for "I would like to _CHANGE my current reservation".

Figure 4:
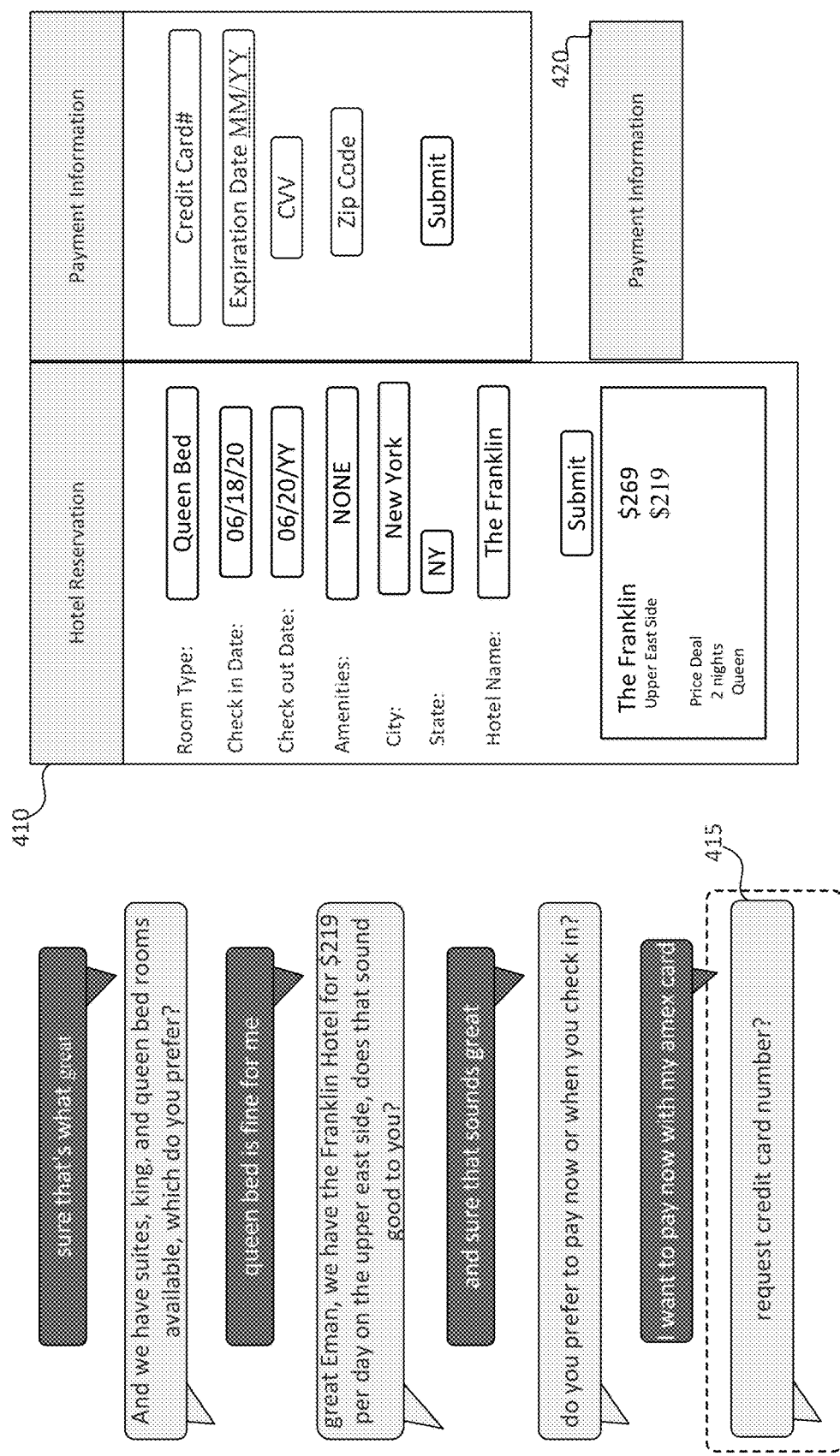
FIG. 4 illustrates a second user interface within agent desktop software for selecting and using workflows, according to some embodiments.

An example of dialog state tracking and action prediction by the agent is also shown in the example conversation and agent GUI of FIG. 4, where the agent desktop software 240 is supposed to autonomously switch from the workflow for reserving a hotel room on behalf of the customer (and having a corresponding GUI 410) to the workflow for payment processing (having a corresponding GUI 420). As soon as the workflow related to hotel reservation has finished confirming the right hotel room for the customer, and the customer has stated that he prefers to make payments over the phone by credit card, the workflow selector 266 suggests (via suggestion element 415) that the human agent transition to billing and ask for the credit card number as the first step of this workflow; if the agent agrees (e.g., by clicking the element 415), then the agent desktop software 240 switches to the GUI 420.

In some embodiments, the workflow selector module 266 applies text matching patterns, such as regular expressions (e.g., "I (want|would like) to change (my|the) address"), that are associated with the various workflows in order to identify candidate workflows. The text matching patterns may be applied to the text of the conversation, with matches indicating that the workflows associated with the matching patterns should be candidates for selection.

In still other embodiments, the workflow selector module 266 uses a search-like approach. The task of identifying appropriate workflows is then performed using a search algorithm run against the workflow search index 261, using (for example) either keyword search or semantic search within the "documents" of text corresponding to the various workflows.

In some embodiments, the agent desktop server 260 has a workflow ingestion module 267 that performs ingestion of workflows into the workflows repository 264 and bootstrapping of intent classifiers for the workflows based on labels and/or documentation associated with each workflow and making up its "document" of text. When a workflow is ingested the system uses the phrases and sentences associated with the workflow as seed training examples for building an intent classifier. In some embodiments, a language model is used to predict similar text and a human designer selects among suggested phrases and sentences to add to the training data. For example, for a given new workflow, the workflow ingestion module may run text indexing algorithms to create an entry including a textual "document" and to add that entry to the workflow search index 261.

In some embodiments, the agent desktop server 260 has a model training module 268 that trains a model used by the workflow selector 266 to select workflows for a given conversation. The model training module 268 monitors and analyzes over time the conversations between agents 205 and customers 203 (e.g., the words and phrases uttered by the customers and/or agents before the agent takes an action) and the corresponding actions by the agent in the agent desktop 240, such as the selection and use of particular workflows. Based on the observed correlations of conversations with selected workflows, the model training module 268 trains a model later used by the workflow selector 266 to identify and rank candidate workflows in real time. Similar techniques such as NL classification models or dialog state tracking can be applied, but in this approach the labels for the classification or state tracking training are derived from the agent's manual selection of specific workflows.

Once a workflow has been selected, the agent uses workflow within the agent desktop software 240 to obtain the information needed to carry out the user's intended task. For example, in FIG. 1, the agent uses the user interface form 140 to complete the movement of the user's service address from the current address to a new address.

Figure 5:
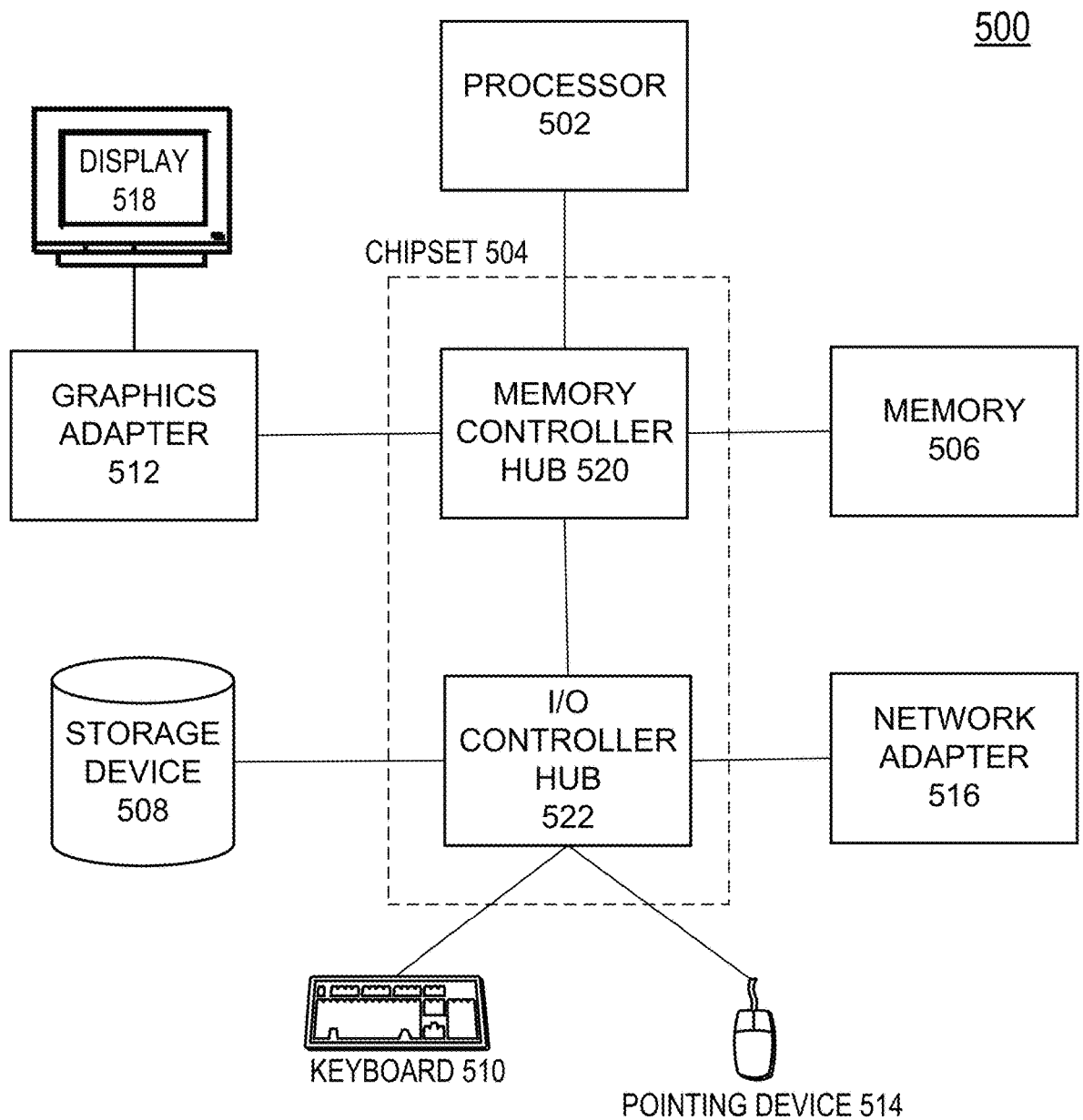
FIG. 5 is a high-level block diagram illustrating physical components of a computer used as part or all of the audio server or agent desktop server from FIG. 1, according to one embodiment.

FIG. 5 is a high-level block diagram illustrating physical components of a computer 500 used as part or all of the audio server 210 or agent desktop server 260 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522.

In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method for assisting a human agent in a conversation between a human user and a system, the method comprising:

based on the conversation, predicting a plurality of alternative candidate next tasks to be performed for the user;

causing display, within a user interface of a human agent associated with the system, of indicators of a set of workflows corresponding to the plurality of alternative candidate next tasks, each workflow specifying a set of data items to obtain from the user;

identifying, from among the set of workflows, a workflow selected by the human agent;

causing display, within the user interface of the human agent, of a set of user interface elements for obtaining the set of data items specified by the identified workflow; and refraining from causing display of sets of user interface elements for obtaining the sets of data items of workflows of the set of workflows other than the workflow selected by the human agent.

2. The computer-implemented method of claim 1, further comprising using the identification of the workflow selected by the human agent, and prior words of the conversation, to train a machine learning model that takes a conversation as input and outputs a set of one or more candidate workflow identifiers.

3. The computer-implemented method of claim 2, wherein the predicting of the plurality of candidate tasks is performed using the machine learning model.

4. The computer-implemented method of claim 1, wherein the predicting of the plurality of candidate tasks comprises:

tracking conversation state of the conversation; and predicting the plurality of candidate tasks according to a probability distribution based on the state.

5. The computer-implemented method of claim 4, wherein the tracking of conversation state uses at least one of: conversation intent, conversation entities, or conversation words.

6. The computer-implemented method of claim 1, wherein the predicting of the plurality of candidate tasks comprises applying preexisting regular expressions corresponding to the plurality of candidate tasks.

7. The computer-implemented method of claim 1, wherein the predicting of the plurality of candidate tasks comprises searching an index of workflows indexed by words in the user interface elements.

8. The computer-implemented method of claim 1, further comprising ingesting a new workflow into a workflow repository, the ingesting comprising indexing textual metadata associated with the new workflow.

9. The computer-implemented method of claim 1, wherein the predicting of the plurality of candidate tasks is performed at each turn of the conversation.

10. A non-transitory computer-readable medium storing instructions that when executed by a computer processor perform actions comprising:

based on a conversation between a human user and a system, predicting a plurality of alternative candidate next tasks to be performed for the user;

causing display, within a user interface of a human agent associated with the system, of indicators of a set of workflows corresponding to the plurality of alternative candidate next tasks, each workflow specifying a set of data items to obtain from the user;

identifying, among the set of workflows, a workflow selected by the human agent;

causing display, within the user interface of the human agent, of a set of user interface elements for obtaining the set of data items specified by the identified workflow; and refraining from causing display of sets of user interface elements for obtaining the sets of data items of workflows of the set of workflows other than the workflow selected by the human agent.

11. The non-transitory computer-readable medium of claim 10, the actions further comprising using the identification of the workflow selected by the human agent, and prior words of the conversation, to train a machine learning model that takes a conversation as input and outputs a set of one or more candidate workflow identifiers.

12. The non-transitory computer-readable medium of claim 11, wherein the predicting of the plurality of candidate tasks is performed using the machine learning model.

13. The non-transitory computer-readable medium of claim 10, wherein the predicting of the plurality of candidate tasks comprises:

tracking conversation state of the conversation; and predicting the plurality of candidate tasks according to a probability distribution based on the state.

14. The non-transitory computer-readable medium of claim 13, wherein the tracking of conversation state uses at least one of: conversation intent, conversation entities, or conversation words.

15. The non-transitory computer-readable medium of claim 10, wherein the predicting of the plurality of candidate tasks comprises applying preexisting regular expressions corresponding to the plurality of candidate tasks.

16. The non-transitory computer-readable medium of claim 10, wherein the predicting of the plurality of candidate tasks comprises searching an index of workflows indexed by words in the user omterface elements.

17. The non-transitory computer-readable medium of claim 10, the actions further comprising ingesting a new workflow into a workflow repository, the ingesting comprising indexing textual metadata associated with the new workflow.

18. The non-transitory computer-readable medium of claim 10, wherein the predicting of the plurality of candidate tasks is performed at each turn of the conversation.

19. A computer server comprising:

a computer processor; and a non-transitory computer-readable medium storing instructions that when executed by the computer processor perform actions comprising:

based on a conversation of a human user, predicting a plurality of alternative candidate next tasks to be performed for the user;

causing display, within a user interface of a human agent associated with the computer server, of indicators of a set of workflows corresponding to the plurality of alternative candidate next tasks, each workflow specifying a set of data items to obtain from the user;

identifying, among the set of workflows, a workflow selected by the human agent;

causing display, within the user interface of the human agent, of a set of user interface elements for obtaining the set of data items specified by the identified workflow; and refraining from causing display of sets of user interface elements for obtaining the sets of data items of workflows of the set of workflows other than the workflow selected by the human agent.

20. The computer server of claim 19, the actions further comprising using the identification of the workflow selected by the human agent, and prior words of the conversation, to train a machine learning model that takes a conversation as input and outputs a set of one or more candidate workflow identifiers.

* * * * *